United States Patent
Bishop et al.

(10) Patent No.: US 9,910,890 B2
(45) Date of Patent: Mar. 6, 2018

(54) SYNTHETIC EVENTS TO CHAIN QUERIES AGAINST STRUCTURED DATA

(71) Applicant: International Business Machines Corporation, Armonk, NY (US)

(72) Inventors: Timothy A. Bishop, Minneapolis, MN (US); Stephen A. Boxwell, Columbus, OH (US); Benjamin L. Brumfield, Cedar Park, TX (US); Nirav P. Desai, Austin, TX (US); Stanley J. Vernier, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 14/739,059

(22) Filed: Jun. 15, 2015

(65) Prior Publication Data

US 2016/0364500 A1 Dec. 15, 2016

(51) Int. Cl.
*G06F 17/30* (2006.01)

(52) U.S. Cl.
CPC .... *G06F 17/3043* (2013.01); *G06F 17/30917* (2013.01)

(58) Field of Classification Search
None
See application file for complete search history.

(56) References Cited

U.S. PATENT DOCUMENTS

| | | | |
|---|---|---|---|
| 6,367,034 B1 * | 4/2002 | Novik | G06F 17/30516 707/999.003 |
| 8,301,438 B2 | 10/2012 | Ferrucci et al. | |
| 8,630,997 B1 * | 1/2014 | Kulkin | G06F 17/30938 707/713 |
| 9,329,975 B2 * | 5/2016 | Park | G06F 11/3636 |
| 9,569,511 B2 * | 2/2017 | Morin | G06F 17/30557 |
| 2004/0064758 A1 * | 4/2004 | Novik | G06F 11/0709 714/37 |
| 2004/0186826 A1 * | 9/2004 | Choi | G06F 17/3043 |
| 2005/0071321 A1 * | 3/2005 | Chen | G06F 17/3046 |
| 2006/0265410 A1 * | 11/2006 | Christianson | G06F 17/30923 |
| 2007/0203893 A1 * | 8/2007 | Krinsky | G06F 17/30864 |

(Continued)

OTHER PUBLICATIONS

Unger et al., "An introduction to Question Answering over Linked Data," Lecture Notes in Computer Science (including subseries Lecture Notes in Artificial Intelligence and Lecture Notes in Bioinformatics), Springer Verlag, vol. 8714, Issue date: 2014, ISSN: 03029743, pp. 100-140.

(Continued)

Primary Examiner — Hung Le
(74) Attorney, Agent, or Firm — VanLeeuwen & VanLeeuwen; William J. Stock

(57) ABSTRACT

An approach is provided in which a knowledge manager analyzes parent/child hierarchies between semi-structured items included in a semi-structured resource. The knowledge manager generates synthetic events based upon the parent/child hierarchy analysis and creates a structured resource utilizing the synthetic events. In one embodiment, the structured resource includes structured resource entries, which include a first semi-structured item, a second semi-structured item, and one of the synthetic events. In turn, the knowledge manager queries the structured resource based upon a question received from a user interface.

17 Claims, 11 Drawing Sheets

(56) References Cited

U.S. PATENT DOCUMENTS

| | | | |
|---|---|---|---|
| 2010/0125584 A1* | 5/2010 | Navas | G06F 17/30516 707/747 |
| 2013/0014088 A1* | 1/2013 | Park | G06F 11/3636 717/128 |
| 2013/0054642 A1* | 2/2013 | Morin | G06F 17/30557 707/770 |
| 2013/0173664 A1* | 7/2013 | Xue | G06F 17/30 707/792 |
| 2013/0226846 A1 | 8/2013 | Li et al. | |
| 2014/0195449 A1* | 7/2014 | Komissarchik | G06F 17/30719 705/319 |
| 2014/0236983 A1* | 8/2014 | Alves | G06F 17/30548 707/769 |
| 2016/0034525 A1* | 2/2016 | Neels | G06F 17/30389 707/737 |
| 2017/0139992 A1* | 5/2017 | Morin | G06F 17/30466 |

OTHER PUBLICATIONS

Yahya et al., "On the SPOT: Question Answering over Temporally Enhanced Structured Data," SIGIR 2013 Workshop on Time-aware Information Access (TAIA'13), Aug. 1, 2013, Dublin, Ireland, 4 pages.
"DBpedia," published by wiki.dbpedia.org, Jan. 2015, 3 pages.
"The World Factbook," United States Central Intelligence Agency, 2013, 2 pages.

* cited by examiner

SYNTHETIC EVENTS TO CHAIN QUERIES AGAINST STRUCTURED DATA

BACKGROUND

A question answer system answers questions posed in a natural language format by applying advanced natural language processing, information retrieval, knowledge representation, automated reasoning, and machine learning technologies. Question answer systems differ from typical document search technologies because document search technologies return a list of documents ranked in order of relevance to a word query, whereas a question answer system receives a question expressed in a natural language, analyzes the question in a natural language context, and returns a precise answer to the question.

System developers may train question answer systems to specific domains to provide more relevant answers to domain-specific questions (e.g., financial domain, travel domain, etc.). One approach to training a question answer system is to ingest corpora from trusted, traditional sources (textbooks, journals) that include accurate information. The question answer system may ingest structured resources, such as relational databases or spreadsheets, which are designed to facilitate finding relationships between specific entities.

At times, semi-structured resources are available to a question answer system to ingest. However, items in semi-structured resource may be loosely organized and not suitable for the question answer system to query.

BRIEF SUMMARY

According to one embodiment of the present disclosure, an approach is provided in which a knowledge manager analyzes parent/child hierarchies between semi-structured items included in a semi-structured resource. The knowledge manager generates synthetic events based upon the parent/child hierarchy analysis and creates a structured resource utilizing the synthetic events. In one embodiment, the structured resource includes structured resource entries, which include a first semi-structured item, a second semi-structured item, and one of the synthetic events. In turn, the knowledge manager queries the structured resource based upon a question received from a user interface.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
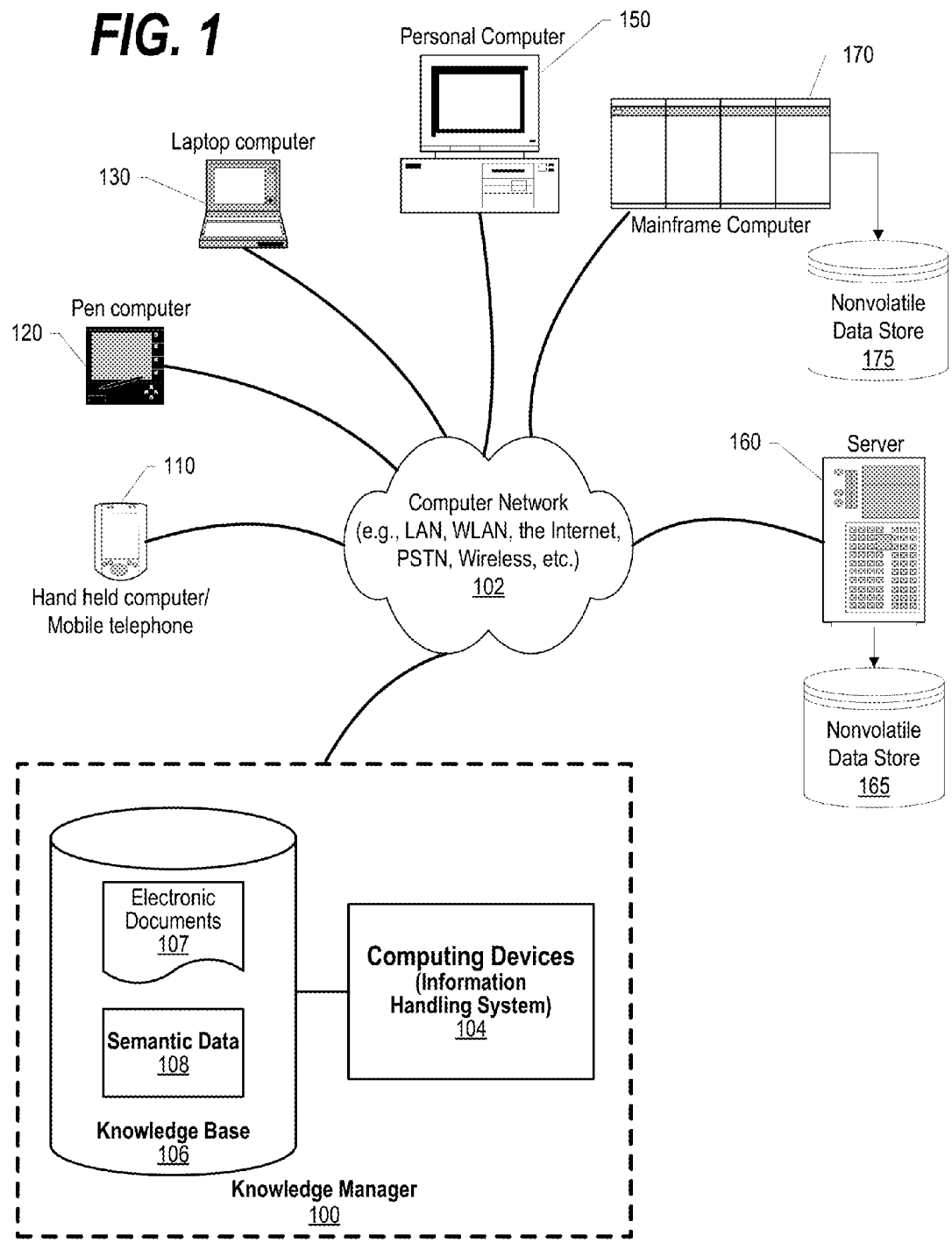
FIG. 1 depicts a schematic diagram of one illustrative embodiment of a knowledge manager system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured resource sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
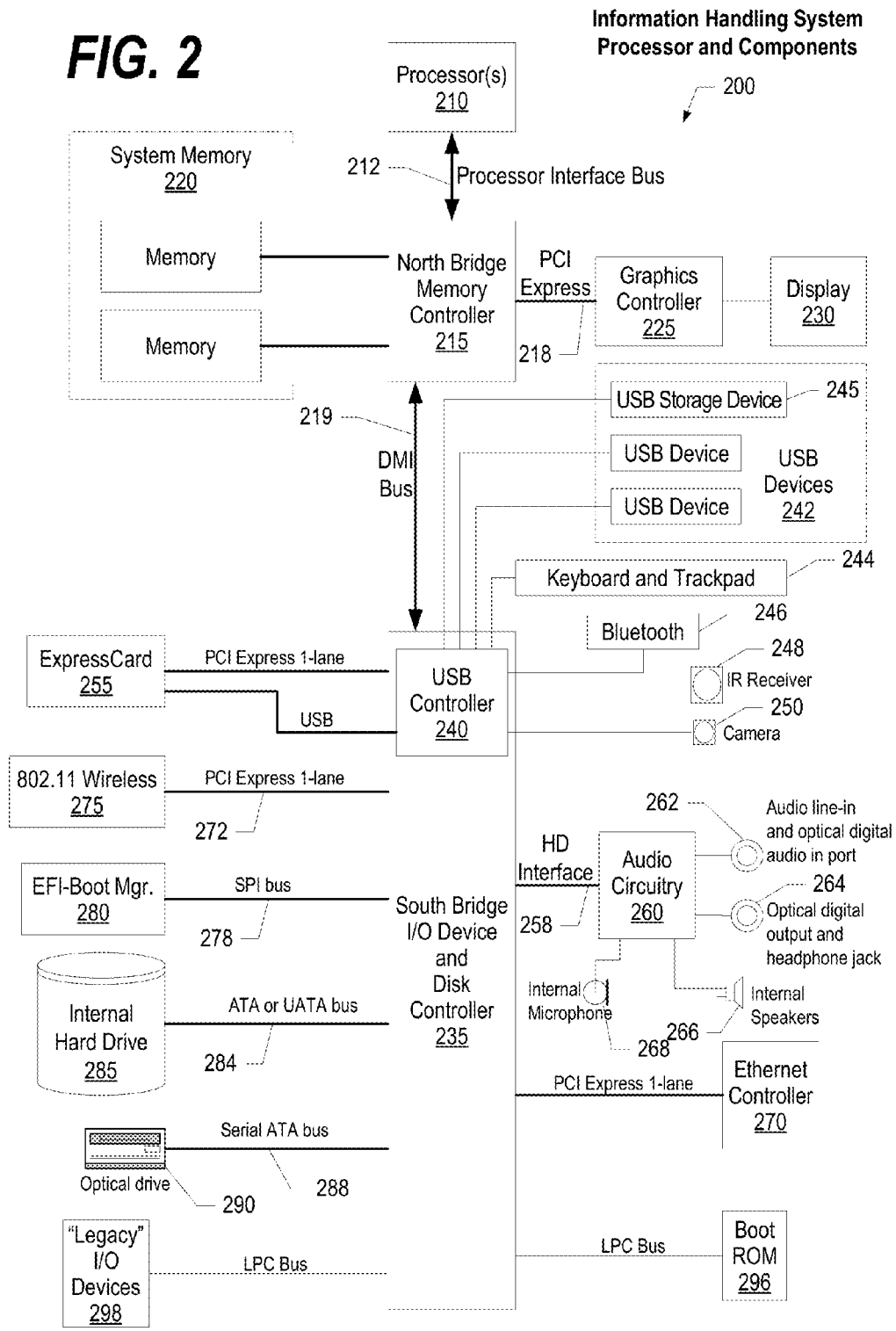
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219.

In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-11 depict an approach that can be executed on an information handling system. The information handling system analyzes a semi-structured resource, such as an outline or tree structure, to identify parent/child relationships between semi-structured items within the semi-structured resource. The information handling system generates synthetic events to represent the parent/child relationships and, in turn, creates a structured resource using the synthetic events, such as a triples database. As discussed herein, a synthetic event is a virtualized entity that links semi-structured items and is utilized to transform the semi-structured resource into a structured resource and facilitate lookup by the information handling system.

Figure 3:
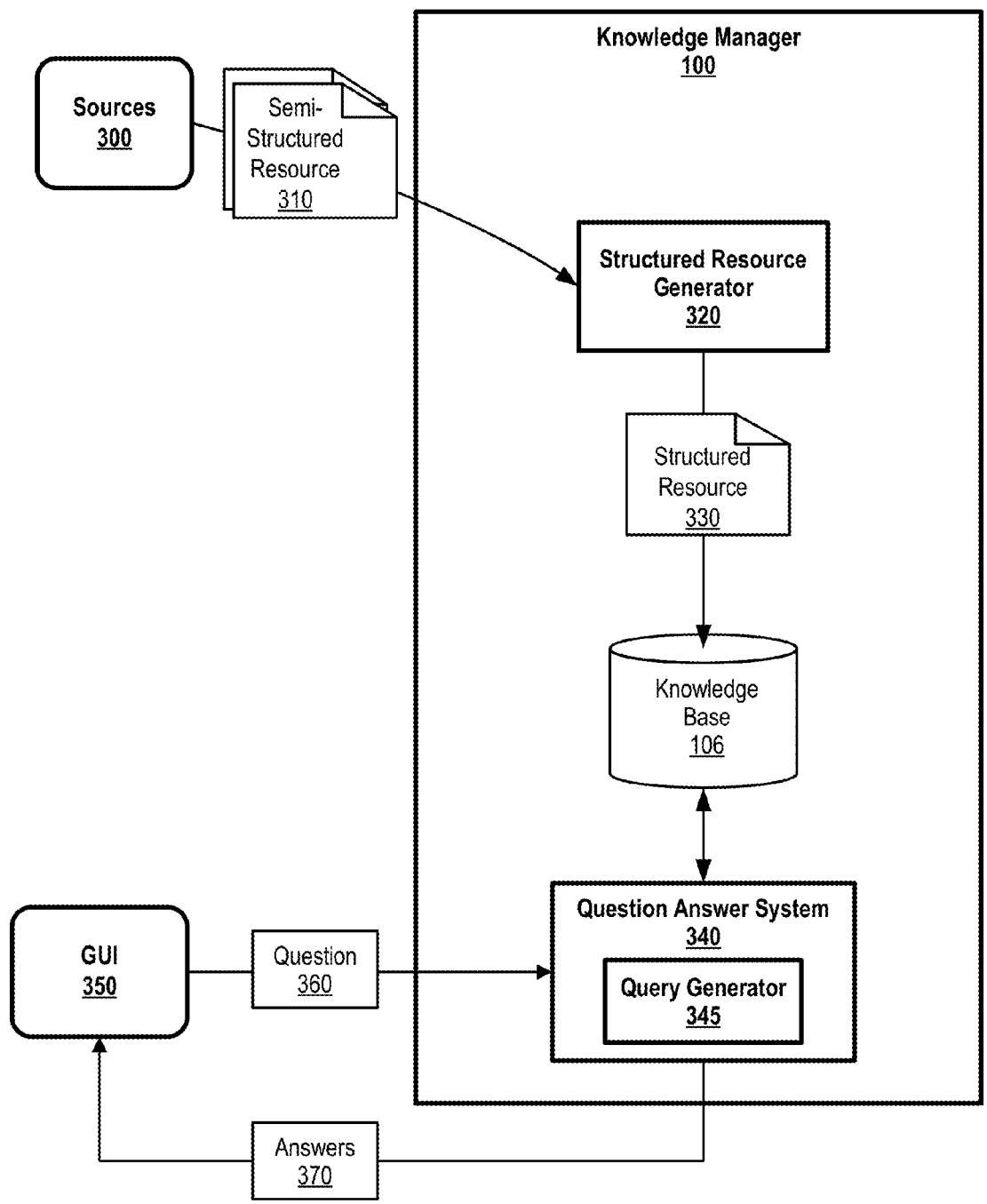
FIG. 3 is an exemplary diagram depicting a knowledge manager using synthetic events to generate a structured resource from a semi-structured resource.

FIG. 3 is an exemplary diagram depicting a knowledge manager using synthetic events to generate a structured resource from a semi-structured resource. The knowledge manager, in turn, generates queries using the synthetic events to query the structured resource. Knowledge manager 100 receives semi-structured resource 310 from sources 300. Semi-structured resource 310 may be, for example, an outline, a tree structure, a spreadsheet, an HTML-formatted table, a CSV (comma-separated values) formatted file, a TSV (tab-separated values) formatted file, a wiki-markup table, an ordered list, an unordered list, or other forms of data that include loosely organized items.

Because semi-structured resource 310 does not provide a clear view on its organization, queries against the resource may not be accurate. To alleviate this issue, knowledge manager 100 uses structured resource generator 320 to transform semi-structured resource 310 into structured resource 330. Structured resource generator 320 identifies parent/child relationships between semi-structured items and creates synthetic events accordingly (see FIG. 5 and corresponding text for further details). In turn, structured resource generator 320 uses the synthetic events to generate structured resource 330. For example, semi-structured resource 310 may be an outline, which structured resource generator 320 generates into a triples database and stores as structured resource 330 (see FIGS. 4, 6, and corresponding text for further details). Structured resource generator 320 stores structured resource 330 in knowledge base 106, which question answer system 340 utilizes during question answer sessions.

During question answer sessions, a user uses GUI (graphical user interface) 350 to generate question 360. Question 360 may be written in a natural language format, such as "What is the population of Angola?" Question answer system 340 analyzes question 360, such as by using natural language processing algorithms to identify the question context of the question, and uses query generator 345 to generate a query. Query generator 345 generates queries using the same synthetic events used by structured resource generator 320 to generate structured resource 330 (see FIGS. 7, 11, and corresponding text for further details). In one embodiment, a list of synthetic events are stored in structured resource 330, which query generator 345 accesses to determine which synthetic events are suitable to build a query to represent question 360.

Question answer system 340 queries structured resource 330 using the generated query, which results in a set of candidate answers. Question answer system 340 scores the candidate answers using various question answer scoring techniques, and provides scored answers 370 to GUI 370 (see FIG. 11 and corresponding text for further details).

Figure 4:
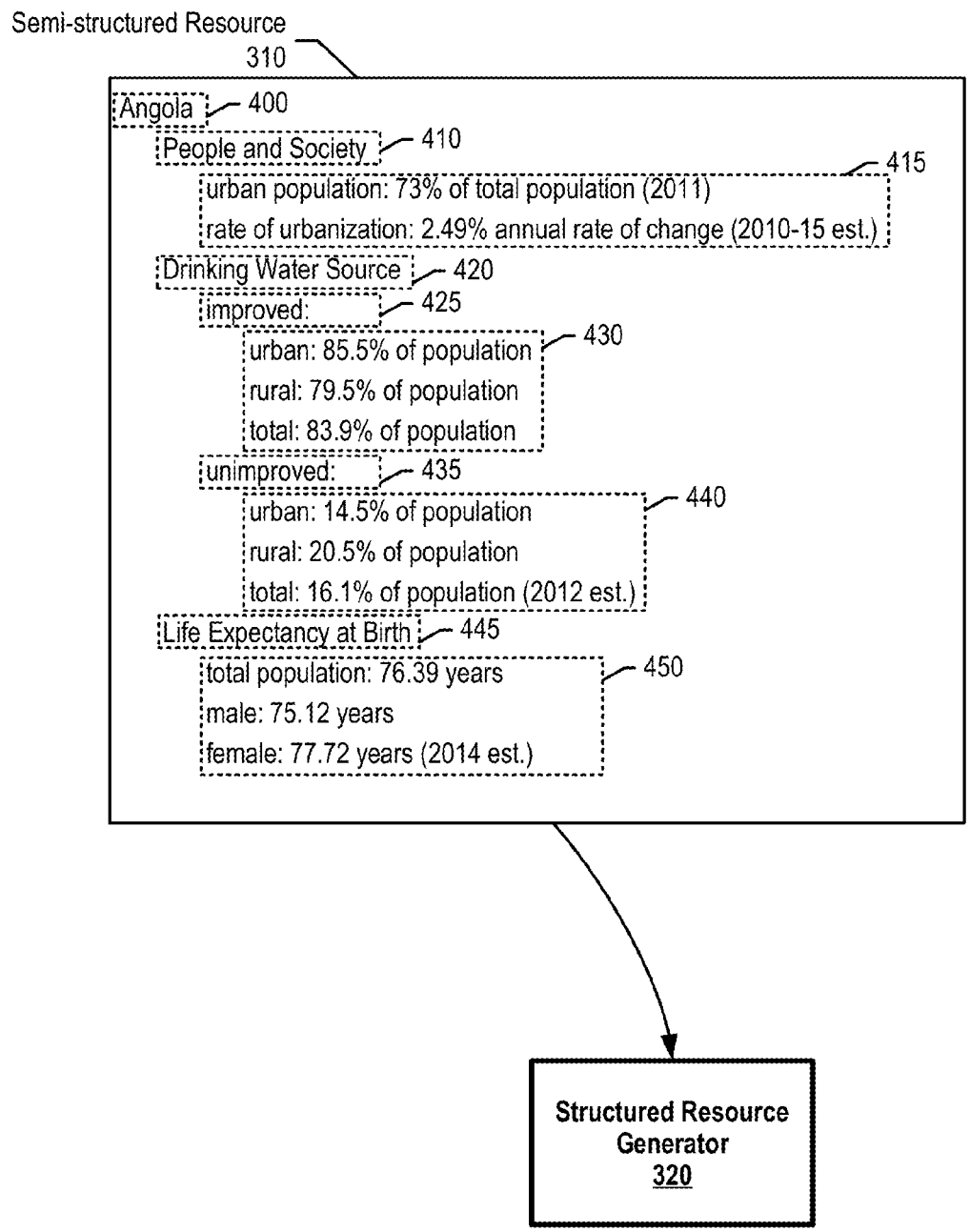
FIG. 4 is an exemplary diagram depicting semi-structured resource feeding into a structured resource generator that generates structured resource using synthetic events.

FIG. 4 is an exemplary diagram depicting semi-structured resource feeding into a structured resource generator that generates structured resource using synthetic events. The example shown in FIG. 4 shows semi-structured resource 310 as an outline. In this example, semi-structured resource has several parent/child hierarchies. Item 400 is a parent to items 410, 420, and 445. Item 410 is a parent to items 415. Item 420 is a parent to item 425, 435, and 445. Item 425 is a parent to items 430. Item 435 is a parent to items 440. And, item 445 is a parent to items 450.

Figure 6:
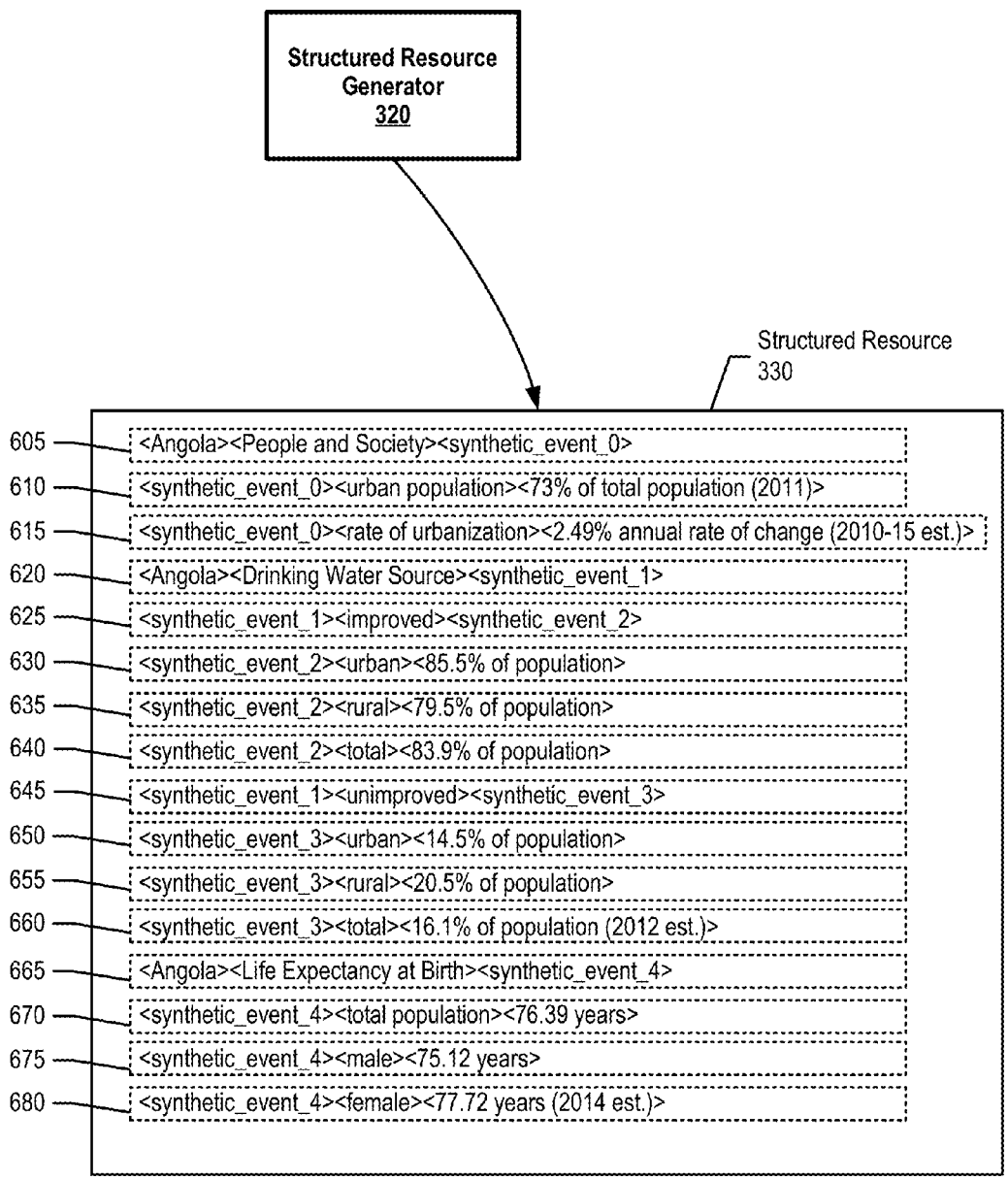
FIG. 6 is an exemplary diagram depicting a structured resource generated by a structured resource generator.

Structured resource generator 320 identifies the parent/child hierarchies and generates synthetic events accordingly to convert the semi-structured resource into structured resource such as that shown in FIG. 6.

Figure 5:
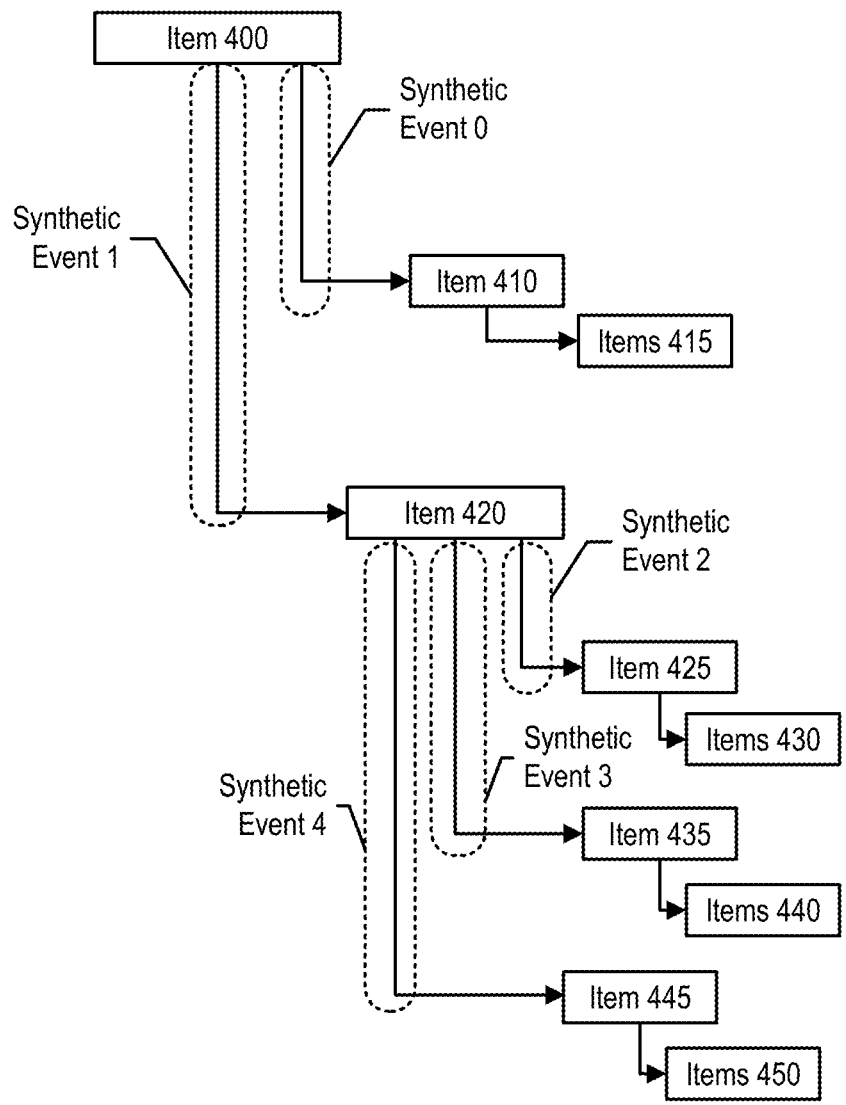
FIG. 5 is an exemplary diagram depicting a simplified example of using synthetic events as virtualized entities to represent parent/child hierarchies that exists within a semi-structured resource.

FIG. 5 is an exemplary diagram depicting a simplified example of using synthetic events as virtualized entities to represent parent/child hierarchies that exists within a semi-structured resource.

FIG. 5 shows synthetic events that represent parent/child hierarchies from semi-structured resource 310 shown in FIG. 4. Synthetic event 0 represents the parent/child hierarchy between item 400 and item 410. In one embodiment, the knowledge manager does not generate synthetic events to represent parent/child hierarchies with the last item in a branch because the last item includes data that is stored in the structured resource (not represented by a synthetic event).

Synthetic event 1 represents the parent/child hierarchy between item 400 and item 420. Synthetic event 2 represents the parent/child hierarchy between item 420 and item 425. Synthetic event 3 represents the parent/child hierarchy between item 420 and item 435. And, synthetic event 4 represents the parent/child hierarchy between item 420 and item 445. As such, the knowledge manager generates a structured resource using synthetic event 0 through synthetic event 4 such as that shown in FIG. 6.

In one embodiment, the knowledge manager generates a synthetic event that links two synthetic events. For example if the semi-structured resource shown in FIG. 5 had deeper branches, the knowledge manager may generate a "synthetic event 5" that links synthetic event 1 and synthetic event 4.

FIG. 6 is an exemplary diagram depicting a structured resource generated by a structured resource generator.

Structured resource 330 is a structured resource that includes several triples entries based upon semi-structured resource 310 shown in FIG. 4. Entry 605 includes synthetic_event_0, which represents the parent/child hierarchy between item 400 and item 410 shown in FIG. 4. As such, entries 610 and 615 correspond to items 415 and include synthetic_event_0. As a result, if a question is "what percentage of the population in Angola is urban?," knowledge manager 100 may generate a query using synthetic_event_0 and determine that entry 610 includes the answer to the question (see FIG. 11 and corresponding text for further details).

Entry 620 includes synthetic_event_1, which represents the parent/child hierarchy between item 400 and item 420 shown in FIG. 4. Entry 625 includes synthetic_event_1, as well as synthetic_event_2, which represents the parent/child hierarchy between item 420 and item 425, and further associates item 425 to item 400 with synthetic_event_1. In turn, entries 630, 635, and 640 include synthetic_event_2, and correspond to items 430.

Entry 645 includes synthetic_event_1, as well as synthetic_event_3, which represents the parent/child hierarchy between item 420 and item 435, and further associates item 435 to item 400 with synthetic_event_1. In turn, entries 650, 655, and 660 include synthetic_event_3 and correspond to items 440.

Entry 665 includes synthetic_event_4, which represents the parent/child hierarchy between item 400 and item 445 shown in FIG. 4. In turn, entries 670, 675, and 680 include synthetic_event_4 and correspond to items 450.

Figure 7:
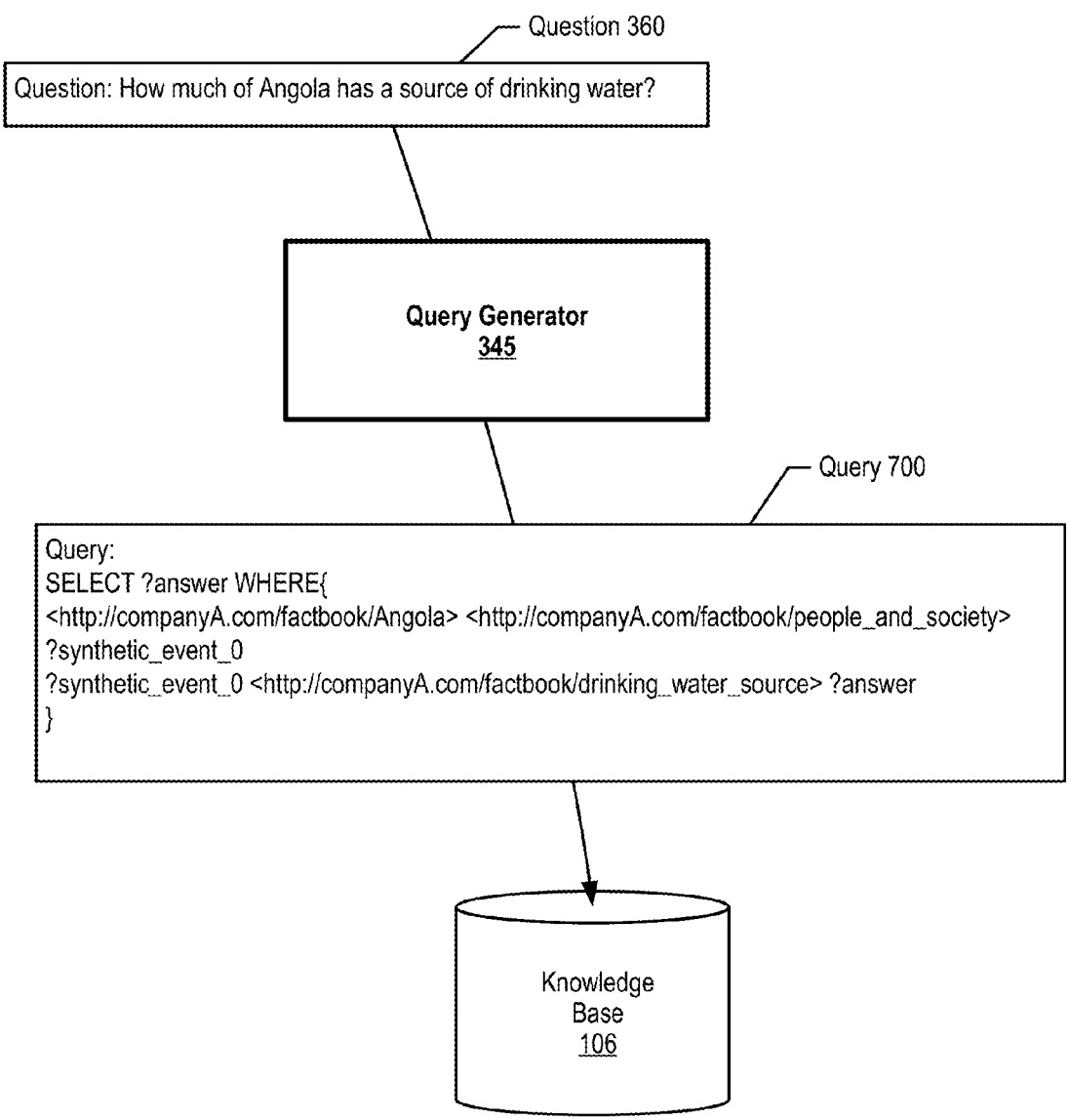
FIG. 7 is an exemplary diagram depicting a query generator generating a query from a question using synthetic events.

FIG. 7 is an exemplary diagram depicting a query generator generating a query from a question using synthetic events. Query generator 345 receives question 360 and applies natural language processing algorithms to understand question 360's question context. Query generator 345 accesses structured resource 330 in knowledge base 106 to identify a path through the structured resource, by way of the synthetic events. In FIG. 7, "?synthetic_event_0" is a variable that can unify with any concrete synthetic event. In turn, query generator 345 generates query 700 to identify candidate answers in structured resource 330.

Figure 8:
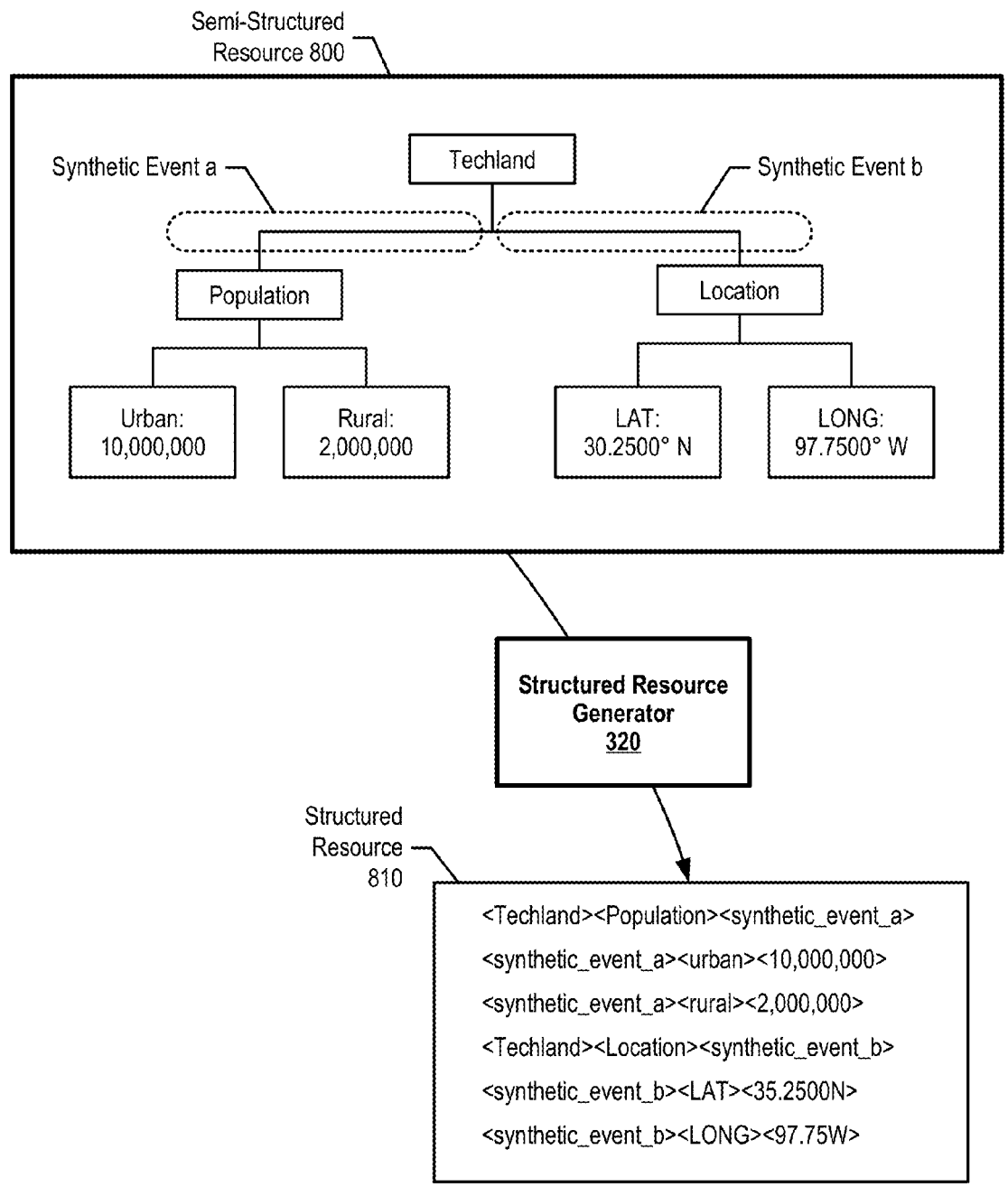
FIG. 8 is an exemplary diagram depicting a structured resource generator receiving a tree structure as input and generating a structured resource using synthetic events.

FIG. 8 is an exemplary diagram depicting a structured resource generator receiving a tree structure as input and generating a structured resource using synthetic events. Structured resource generator 320 analyzes semi-structured resource 800 and identifies parent/child hierarchies between the various items, such as those between techland/population (synthetic event a) and techland/location (synthetic event b). As discussed previously, structured resource generator 320, in one embodiment, does not generate synthetic events for the last item in a branch because these items include data, which is stored in the structured resource. Structured resource generator 320 generates structured resource 810 accordingly based upon semi-structured resource 800, synthetic event a, and synthetic event b.

Figure 9:
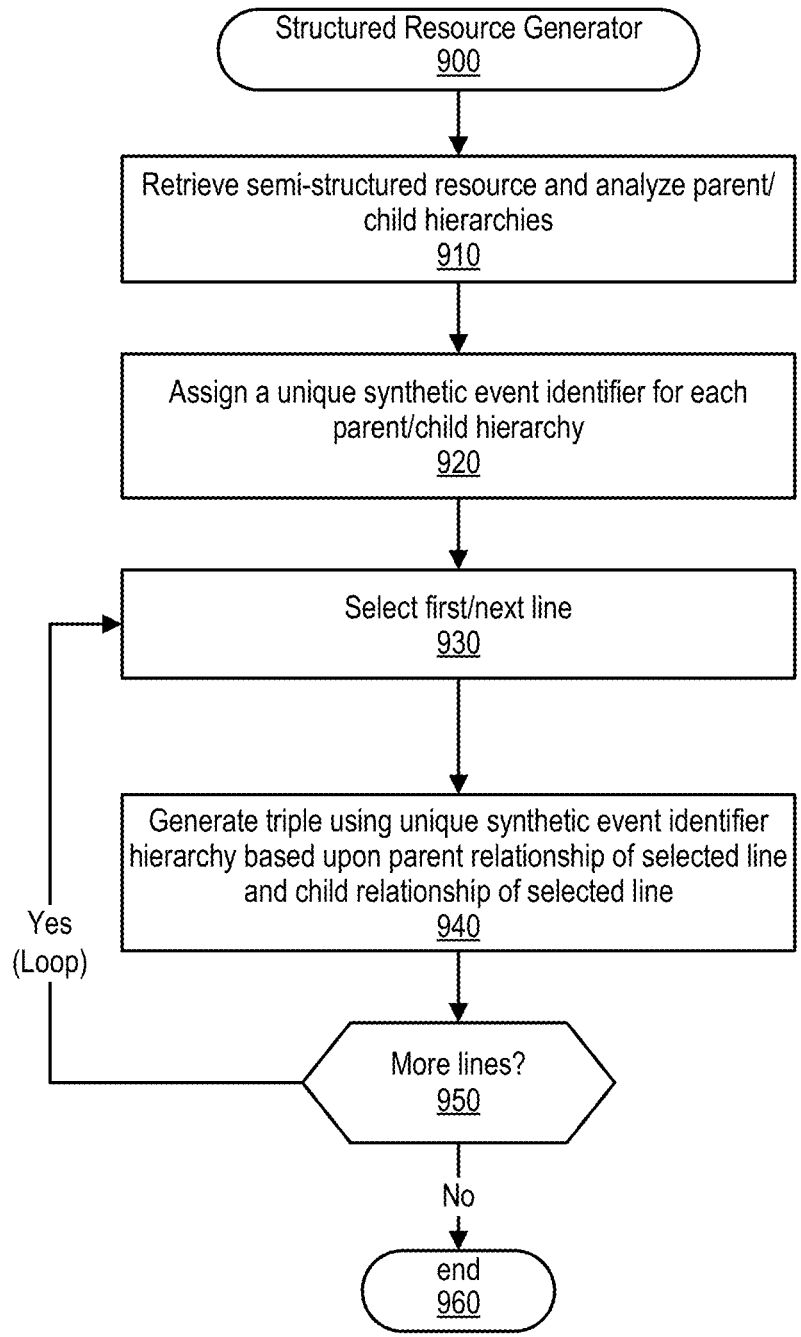
FIG. 9 is an exemplary flowchart depicting high-level steps taken by a knowledge manager to generate a structured resource from a semi-structured resource using synthetic events.

FIG. 9 is an exemplary flowchart depicting high-level steps taken by a knowledge manager to generate a structured resource from a semi-structured resource using synthetic events. Processing commences at 900 whereupon, at step 910, the process retrieves a semi-structured resource and analyzes the parent/child hierarchies between semi-structured items included in the semi-structured resource. At step

920, the process assigns a unique synthetic event identifier for each parent/child hierarchy except for, in one embodiment, the last parent/child hierarchy within a branch.

At step 930, the process selects a first line in the semi-structured resource and, at step 940, the process generates a triple using the unique synthetic event corresponding to the selected line's parent/child hierarchy. In one embodiment, the process may generate multiple triples to account for various layers within the semi-structured resource. For example, referring to FIG. 6, triple 625 includes two synthetic events to bridge the parent/child/grandchild hierarchy from item 400, to item 420, to item 425.

The process determines as to whether there are more lines to evaluate (decision 950). If there are more lines to evaluate, then decision 950 branches to the 'yes' branch, which loops back to select and process the next line. This looping continues until there are no more lines to evaluate, at which point decision 950 branches to the 'no' branch. FIG. 9 processing thereafter ends at 960.

Figure 10:
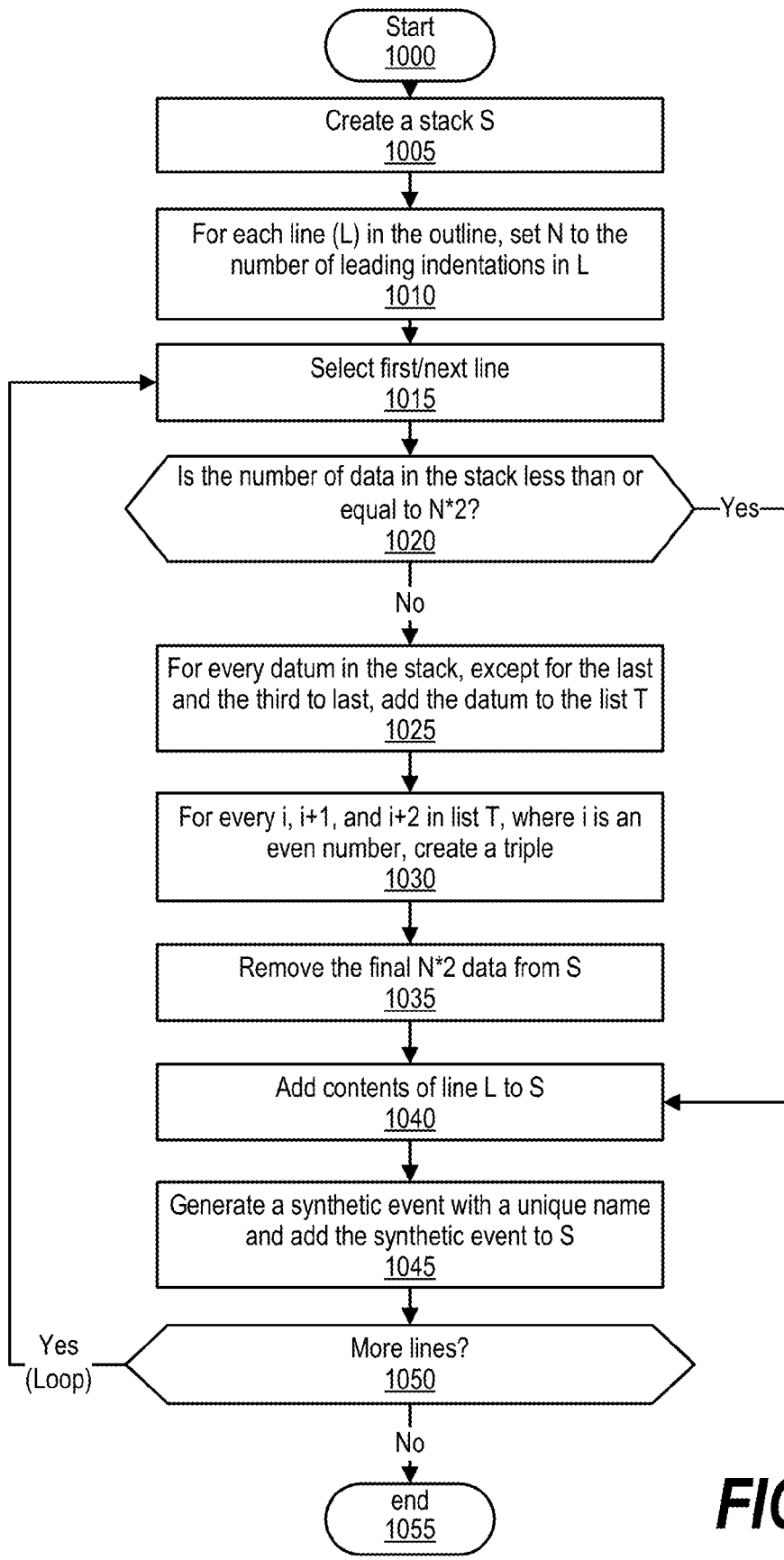
FIG. 10 is an exemplary flowchart depicting detailed steps of an embodiment to generate a structured resource from a semi-structured resource using synthetic events.

FIG. 10 is an exemplary flowchart depicting detailed steps of an embodiment to generate a structured resource from a semi-structured resource using synthetic events. Processing commences at 1000 whereupon, at step 1005, the process creates a stack "S." At step 1010, for each line (L) in the outline, the process sets N to the number of leading indentations in each line. For example, if a line includes three tabs before an item, the process sets N at 3 for the particular line.

At step 1015, the process selects a first line, and a decision is made as to whether the number of data in the stack is less than or equal to N*2 (decision 1020). In one embodiment, the process makes this determination because, if the number of data in the stack are less than or equal to 2*N, then that means that the process has not yet reached a "leaf" node in the abstract outline and therefore are not yet ready to write this chain of lookups to a triple database.

If the number of data in the stack is less than or equal to N*2, decision 1020 branches to the "Yes" branch, bypassing steps 125 through 1035. On the other hand, if the number of data in the stack is not less than or equal to N*2, decision 102 branches to the "No" branch, whereupon, at step 1025, for every datum in the stack except for the last and the third to last, the process adds the datum to the list T. This prevents unnecessary synthetic events from being included. For example, if a chain is only three entities long, no synthetic events are needed at all. For example, if the entities are "France", "capital" and "Paris", this can be accurately represented in the triple:

<http://companyA.com/demo/resource/France>
<http://companyA.com/demo/property/capital>
<http://companyA.com/demo/resource/Paris>.

At step 1030, for every i, i+1, and i+2 in list T, where i is an even number, the process create a triple. As discussed above, the stack S is populated with a chain of entities, relations, and synthetic events. For example, a chain may look like <France> <government> <synthetic_event_0> <capital> <Paris> (full URLs omitted). As such, the chain should be converted into a pair of triples: <France> <government> <synthetic_event_0>, and <synthetic_event_0> <capital> <Paris>. In this example, if the property "government" has other sub-headings, the other sub-headings also appear under <synthetic_event_0>.

At step 1035, the process removes the final N*2 data from the stack to catch the last chain in the outline and, at step 1040, the process adds the contents of the line to the stack.

At step 1045, the process generates a synthetic event with a unique name and adds the synthetic event to the stack.

The process determines as to whether there are more lines to evaluate (decision 1050). If there are more lines to evaluate, then decision 1050 branches to the 'yes' branch, which loops back to select and process the next line. On the other hand, if there are no more lines to evaluate, then decision 1050 branches to the 'no' branch. FIG. 10 processing thereafter ends at 1055.

Figure 11:
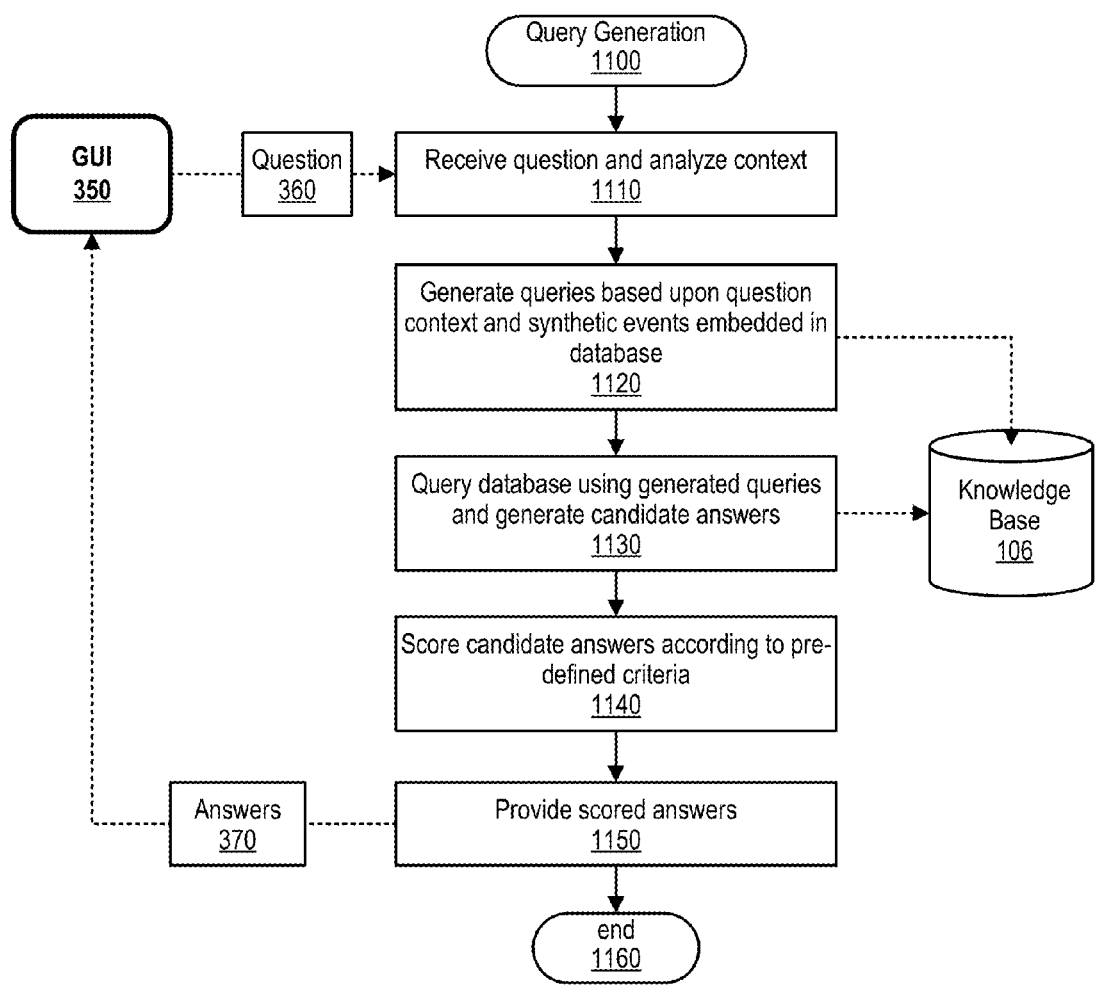
FIG. 11 is an exemplary flowchart depicting steps taken by a knowledge manager to analyze a question and generate a query with synthetic events to query a structured resource.

FIG. 11 is an exemplary flowchart depicting steps taken by a knowledge manager to analyze a question and generate a query with synthetic events to query a structured resource. Processing commences at 1100 whereupon, at step 1110, the process receives question 360 from GUI 350 and analyzes the context. For example, the process may use natural language processing to determine the context of question 360.

At step 1120, the process evaluates queries included in knowledge base 106 and generates queries based upon the question's context and the synthetic events. A database query may include a synthetic event variable that may correspond to any synthetic event in the database that matches the rest of the query. For the purposes of a question answer system, the end user is not required to know specifically which synthetic event the query uses. For example, in the question "What is the capital of France?", the question answer system may issue a database query meaning: "Find a synthetic event that matches <France> <government> <SYNTHETIC_EVENT_X>, then find an answer that matches <SYNTHETIC_EVENT_X> <capital> <ANSWER>.

At step 1130, the process queries the structured resource using the generated queries and generates candidate answers accordingly. At step 1140, the process scores the candidate answers according to pre-defined question answer criteria and, at step 1150, the process provides the scored answers (answers 370) to GUI 350, and FIG. 11 processing thereafter ends at 1160.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

generating a plurality of synthetic events based upon analyzing a plurality of parent/child hierarchies between a plurality of semi-structured items included in a semi-structured resource, wherein each of the one or more synthetic events corresponds to at least one of the plurality of parent/child hierarchies;

creating a structured resource, based upon the plurality of synthetic events, that includes a plurality of structured resource entries, wherein at least one of the plurality of structured resource entries includes a first one of the plurality of semi-structured items, a second one of the plurality of semi-structured items, and at least a selected one of the plurality of synthetic events, wherein the selected synthetic event corresponds to a third one of the plurality of semi-structured items that is a parent entry of the second semi-structured item; and querying the structured resource based upon a question received from a user interface.

2. The method of claim 1 further comprising:

generating a query that includes a synthetic event variable corresponding to at least one of the plurality of synthetic events; and utilizing the generated query in the querying of the structured resource.

3. The method of claim 2 wherein the information handling system is a question answer system, the method further comprising:

analyzing the received question using one or more natural language processing algorithms, resulting in question context; and utilizing the question context in the generating of the query.

4. The method of claim 1 wherein the semi-structure resource includes a plurality of lines, the method further comprising:

identifying a first one of the plurality of lines that includes a first amount of indentations and the third semi-structured item;

identifying a second one of the plurality of lines that includes a second amount of indentations and a fourth one of the plurality of semi-structured items, wherein the second amount of indentations is more than the first amount of indentations;

identifying a third one of the plurality of lines that includes a third amount of indentations, the first semi-structured item, and the second semi-structured item, wherein the third amount of indentations is more than the second amount of indentations, and wherein the synthetic event links the third semi-structured item to the fourth semi-structured item; and wherein the at least one of the plurality of structured resource entries associates the third semi-structured resource to the first semi-structured resource.

5. The method of claim 1 wherein the semi-structured resource is selected from the group consisting of an outline, a tree structure, a spreadsheet, an HTML-formatted table, a CSV formatted file, a TSV formatted file, a wiki-markup table, an ordered list, and an unordered list.

6. The method of claim 1 wherein the structured resource is a triples database.

7. An information handling system comprising:
one or more processors;
a memory coupled to at least one of the processors; and
a set of computer program instructions stored in the memory and executed by at least one of the processors in order to perform actions of:

generating a plurality of synthetic events based upon analyzing a plurality of parent/child hierarchies between a plurality of semi-structured items included in a semi-structured resource, wherein each of the one or more synthetic events corresponds to at least one of the plurality of parent/child hierarchies;

creating a structured resource, based upon the plurality of synthetic events, that includes a plurality of structured resource entries, wherein at least one of the plurality of structured resource entries includes a first one of the plurality of semi-structured items, a second one of the plurality of semi-structured items, and at least a selected one of the plurality of synthetic events, wherein the selected synthetic event corresponds to a third one of the plurality of semi-structured items that is a parent entry of the second semi-structured item; and querying the structured resource based upon a question received from a user interface.

8. The information handling system of claim 7 wherein at least one of the one or more processors perform additional actions comprising:

generating a query that includes a synthetic event variable corresponding to at least one of the plurality of synthetic events; and utilizing the generated query in the querying of the structured resource.

9. The information handling system of claim 8 wherein the information handling system is a question answer system, and wherein at least one of the one or more processors perform additional actions comprising:

analyzing the received question using one or more natural language processing algorithms, resulting in question context; and utilizing the question context in the generating of the query.

10. The information handling system of claim 7 wherein the semi-structure resource includes a plurality of lines, and wherein at least one of the one or more processors perform additional actions comprising:

identifying a first one of the plurality of lines that includes a first amount of indentations and the third semi-structured item;

identifying a second one of the plurality of lines that includes a second amount of indentations and a fourth one of the plurality of semi-structured items, wherein the second amount of indentations is more than the first amount of indentations;

identifying a third one of the plurality of lines that includes a third amount of indentations, the first semi-structured item, and the second semi-structured item, wherein the third amount of indentations is more than the second amount of indentations, and wherein the synthetic event links the third semi-structured item to the fourth semi-structured item; and wherein the at least one of the plurality of structured resource entries associates the third semi-structured resource to the first semi-structured resource.

11. The information handling system of claim 7 wherein the semi-structured resource is selected from the group consisting of an outline, a tree structure, a spreadsheet, an HTML-formatted table, a CSV formatted file, a TSV formatted file, a wiki-markup table, an ordered list, and an unordered list.

12. The information handling system of claim 7 wherein the structured resource is a triples database.

13. The computer program product of claim 7 wherein:
the semi-structured resource is selected from the group consisting of an outline, a tree structure, a spreadsheet, an HTML-formatted table, a CSV formatted file, a TSV formatted file, a wiki-markup table, an ordered list, and an unordered list; and
the structured resource is a triples database.

14. A computer program product stored in a computer readable storage medium, comprising computer program code that, when executed by an information handling system, causes the information handling system to perform actions comprising:
generating a plurality of synthetic events based upon analyzing a plurality of parent/child hierarchies between a plurality of semi-structured items included in a semi-structured resource, wherein each of the one or more synthetic events corresponds to at least one of the plurality of parent/child hierarchies;
creating a structured resource, based upon the plurality of synthetic events, that includes a plurality of structured resource entries, wherein at least one of the plurality of structured resource entries includes a first one of the plurality of semi-structured items, a second one of the plurality of semi-structured items, and at least a selected one of the plurality of synthetic events, wherein the selected synthetic event corresponds to a third one of the plurality of semi-structured items that is a parent entry of the second semi-structured item; and
querying the structured resource based upon a question received from a user interface.

15. The computer program product of claim 14 wherein the information handling system performs additional actions comprising:
generating a query that includes a synthetic event variable corresponding to at least one of the plurality of synthetic events; and
utilizing the generated query in the querying of the structured resource.

16. The computer program product of claim 14 wherein the information handling system is a question answer system and performs additional actions comprising:
analyzing the received question using one or more natural language processing algorithms, resulting in question context; and
utilizing the question context in the generating of the query.

17. The computer program product of claim 14 wherein the semi-structure resource includes a plurality of lines, and wherein the information handling system performs additional actions comprising:
identifying a first one of the plurality of lines that includes a first amount of indentations and the third semi-structured item;
identifying a second one of the plurality of lines that includes a second amount of indentations and a fourth one of the plurality of semi-structured items, wherein the second amount of indentations is more than the first amount of indentations;
identifying a third one of the plurality of lines that includes a third amount of indentations, the first semi-structured item, and the second semi-structured item, wherein the third amount of indentations is more than the second amount of indentations, and wherein the synthetic event links the third semi-structured item to the fourth semi-structured item; and
wherein the at least one of the plurality of structured resource entries associates the third semi-structured resource to the first semi-structured resource.

* * * * *